UNITED STATES PATENT OFFICE.

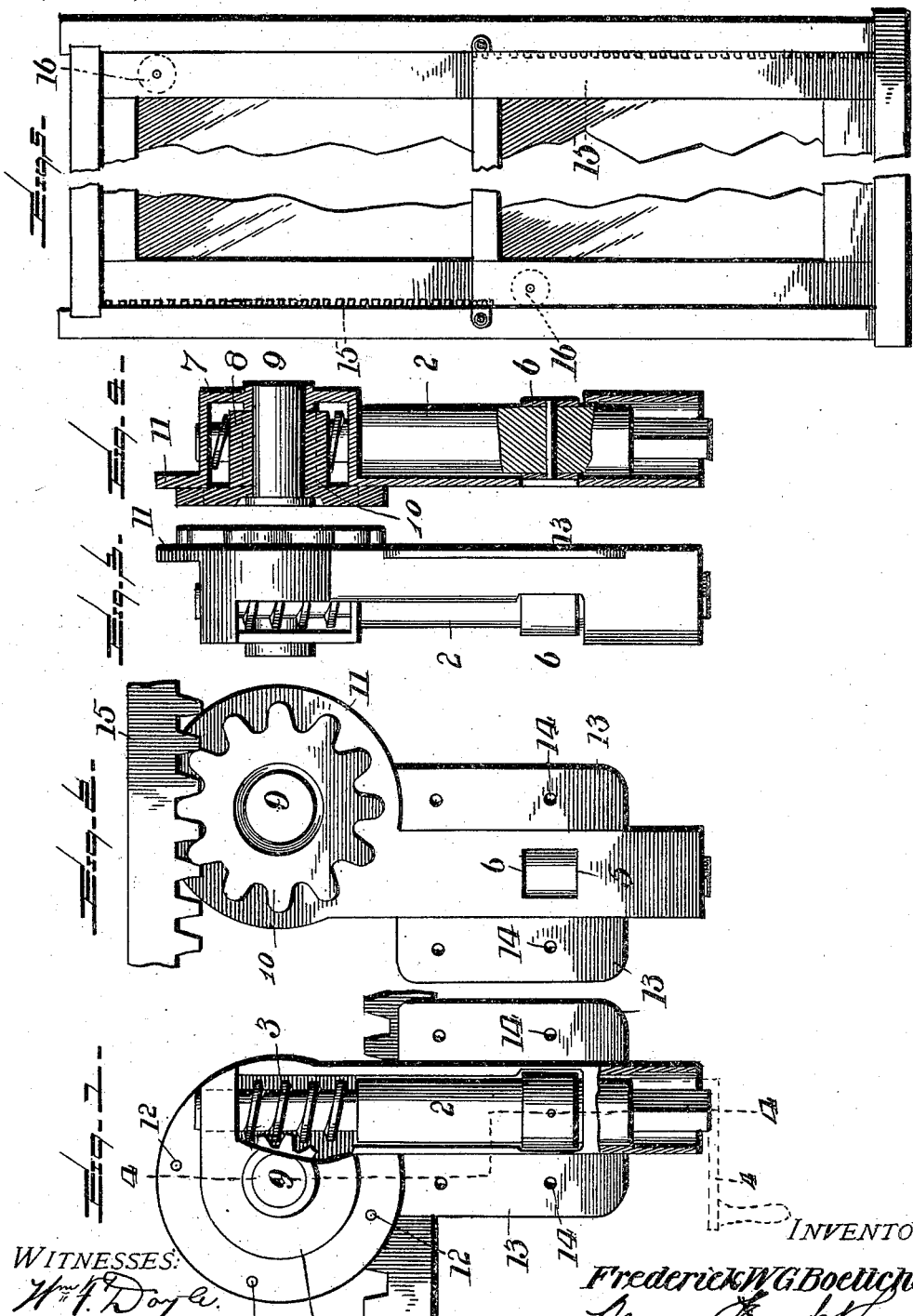

FREDERICK W. G. BOETTCHER, OF DETROIT, MICHIGAN.

SASH ADJUSTER AND LOCK.

SPECIFICATION forming part of Letters Patent No. 708,517, dated September 9, 1902.

Application filed May 24, 1901. Serial No. 61,757. (No model.)

*To all whom it may concern:*

Be it known that I, FREDERICK W. G. BOETTCHER, a citizen of the United States, residing at Detroit, in the county of Wayne and State of Michigan, have invented certain new and useful Improvements in Window-Sash Adjusters and Locks; and I do hereby declare the following to be a full, clear, and exact description of the invention, such as will enable others skilled in the art to which it appertains to make and use the same.

This invention relates to improvements in window-sash adjusters and locks, and more particularly to such a device adapted to adjust a window-sash to any desired vertical position and automatically lock the same.

The object in view is the production of a sash-adjuster applicable to any of the common forms of sashes, the operation of which will impart a quick positive upward or downward movement to a sash and when so raised and lowered will retain the said sash in such position until again operated.

With this and other objects in view it consists of certain novel constructions, combinations, and arrangements of parts, as will be hereinafter fully described and claimed.

In the accompanying drawings, Figure 1 represents a view in front elevation of a window-sash adjuster and lock embodying the features of the present invention, parts of the casing being broken away to better illustrate the parts. Fig. 2 is a view in elevation of the opposite face to that shown in Fig. 1 of the same parts, the rack-bars being shown in position. Fig. 3 represents a side elevation of the adjuster and lock. Fig. 4 represents a vertical longitudinal section of the same on line 4 4 of Fig. 1; and Fig. 5 represents a view in side elevation of the application of the adjuster and lock to the two sashes of a window, the central portion of the window being broken away.

Referring to the drawings by numerals, 1 indicates a suitable casing partially inclosing a suitable shaft, as 2, which shaft finds bearings at its inner end and near its outer end in said casing 1. The inner end of shaft 2 is preferably formed with a suitable worm-thread, as 3, and the outer end is formed polygonal and is adapted to receive a suitable key, as 4, for rotating the same. At a suitable point intermediate the length of casing 1 is formed an aperture, as 5, in the wall of the casing, and a sleeve, as 6, is rigidly secured to shaft 2 and adapted to rotate in said aperture, the ends of said sleeve forming annular shoulders engaging the walls of casing 1 surrounding said aperture, and thereby preventing longitudinal movement of said shaft 2 with respect to said casing.

The casing 1 is enlarged at its inner end and forms a housing, as 7, for a worm-wheel, as 8, meshing with the worm-thread 3 of shaft 2. Wheel 8 is rigidly secured in any preferred manner to a shaft, as 9, and is rotatable thereupon, said shaft being rigidly secured at one end to housing 7. The opposite end of shaft 9 to the one carrying wheel 8 projects beyond the inner wall of housing 7 and carries a gear-wheel, as 10, which is adapted to rotate upon said shaft. The gear-wheel 10 is formed integral with worm-wheel 8 and is provided with suitable teeth upon its periphery adapted in operation to mesh with the teeth of a suitable rack-bar, as 15, carried by one of the vertical strips of a window-sash.

An annular flange, as 11, is preferably formed upon housing 7 and is provided with apertures, as 12 12, for receiving suitable securing means for retaining the adjuster in position. Small flanges, as 13 13, may be formed upon casing 1 near its lower end and each provided with a single aperture, as 14, for receiving securing means.

In the application of the present invention a pair of the improved sash-adjusters is employed, one being secured to each vertical casing and so arranged that the polygonal end of shaft 2 will extend outwardly and within reach of key 4. (Shown in dotted lines in Fig. 1.) A pair of rack-bars 15, each of which is of suitable size and shape and provided with teeth adapted to mesh with the teeth of gear-wheel 10 of its respective adjuster, is employed, and each is secured in any suitable manner to one of the vertical strips of a window-sash, the rack-bar of one sash being arranged upon the opposite side of that of the other sash, as shown in Fig. 5. When the parts are thus assembled, rotation of shaft 2, by means of key 4 of either adjuster, will, through worm-thread 3 and gear-wheel 8, rotate gear-wheel 10, whereby the sash carrying the rack-bar 15, whose teeth mesh with the device being operated, will be raised and lowered according to the direction of the rotation shaft 2. It will be observed that the gear-wheel 10 projects to one side of the casing or housing 7, its faces lying parallel with the faces of said housing. When the mechanism is put in place or countersunk in the inner face of a window-frame, the gear-wheel 10 thus projects sufficiently to engage either a rack to the rear of it on the upper sash or a rack to the front of it on the outer face of the lower sash. When the window-adjuster is put in position with its flanges 13 flush with the surface of the window-casing, the gear-wheel 10 is all that projects, it being arranged in line with the rack-bars on the window-sashes. The pressure for moving each rack being upon one side only I find it desirable to provide rollers or other antifriction means, as 16, on the vertical strip of the sash opposite to that carrying the rack-bar 15, whereby danger of binding is obviated.

It will of course be understood that I may provide right and left adjusters and locks on each sash, if required by the size of the window to which the same is applied.

The housing is preferably let into the material of the jamb of the window and the parts made fast to said jamb by means of suitable securing means passed through the apertures in flanges 11 and 13, whereby the parts of the adjuster will be securely held against longitudinal or lateral movement.

By turning the shaft 2 the worm-wheel and gear-wheel are both rotated, the teeth of the latter moving at a greater speed than the former, whereby a given speed of rotation of the shaft will give a relatively increased speed to the sash in raising and lowering. By this means the locking function of the worm-gearing is utilized and at the same time its objectionably slow action avoided.

Having thus described my invention, what I claim as new, and desire to secure by Letters Patent, is—

A window-sash adjuster and lock, comprising a casing adapted to be countersunk in the frame of a window so as to lie flush therewith, a gear-wheel of comparatively large diameter projecting outside the casing and adapted to engage a rack either to the rear or the front thereof upon the upper or lower sash of a window, a comparatively small pinion or worm-wheel extending inwardly from the said gear-wheel into the casing, a worm engaging said pinion or worm-wheel, a shaft carrying the said worm and finding bearings in the casing, the upper end of said shaft being reached through the opening in the front of a window-casing and formed with a squared end by which it may be turned, substantially as described.

In testimony whereof I hereunto affix my signature in presence of two witnesses.

FREDERICK W. G. BOETTCHER.

Witnesses:
R. F. DUVERNOIS,
CHARLES C. RATH.